(12) United States Patent
Spalding (10) Patent No.: US 12,070,156 B2
(45) Date of Patent: Aug. 27, 2024

(54) SYSTEM AND METHOD FOR DETECTING FOOD ITEMS AND MANAGING COOKING TIMERS ON A COOKTOP APPLIANCE

(71) Applicant: Haier US Appliance Solutions, Inc., Wilmington, DE (US)

(72) Inventor: Weston Spalding, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 610 days.

(21) Appl. No.: 17/206,957

(22) Filed: Mar. 19, 2021

(65) Prior Publication Data

US 2022/0296037 A1   Sep. 22, 2022

(51) Int. Cl.
| | |
|---|---|
| *A47J 36/32* | (2006.01) |
| *G06F 18/22* | (2023.01) |
| *G06N 3/08* | (2023.01) |
| *G06V 10/75* | (2022.01) |
| *G06V 20/00* | (2022.01) |
| *G06V 20/68* | (2022.01) |
| *H04N 7/18* | (2006.01) |

(52) U.S. Cl.
CPC ............ *A47J 36/321* (2018.08); *G06F 18/22* (2023.01); *G06N 3/08* (2013.01); *G06V 10/751* (2022.01); *G06V 20/00* (2022.01); *H04N 7/18* (2013.01); *G06V 20/68* (2022.01)

(58) Field of Classification Search
CPC ........ G06N 3/08; G06N 3/047; G06N 3/0464; G06V 10/82; G06V 20/00; G06V 10/454; G06V 10/751; G06V 20/68; A47J 36/321; G06F 18/22; H04N 7/18; H05B 6/64; G06B 3/08

USPC ............................................................ 99/327
See application file for complete search history.

(56) References Cited

U.S. PATENT DOCUMENTS

| | | | | |
|---|---|---|---|---|
| 6,976,004 B2* | 12/2005 | Wittrup | .................. | G06Q 50/12 425/523 |
| 8,419,433 B2* | 4/2013 | Do | ...................... | G06F 16/9535 219/385 |
| 11,069,045 B2* | 7/2021 | Fox | ........................ | G06N 20/00 |
| 11,672,050 B2* | 6/2023 | Cheng | .................. | H05B 3/0076 219/411 |
| 11,687,776 B2* | 6/2023 | Jeong | .................... | G06F 16/951 706/15 |
| 2004/0129693 A1* | 7/2004 | Hook | .................... | A47J 36/321 219/483 |

(Continued)

FOREIGN PATENT DOCUMENTS

| | | |
|---|---|---|
| CN | 102314695 A | 1/2012 |
| DE | 102017206056 A1 | 10/2018 |

(Continued)

*Primary Examiner* — Eric S Stapleton
(74) *Attorney, Agent, or Firm* — Dority & Manning, P.A.

(57) ABSTRACT

A method of monitoring a cooking process using an over-the-range appliance mountable over a cooktop appliance having a cooktop surface includes obtaining an image of the cooktop surface, analyzing the image to identify a first food item positioned on the cooktop surface, and initiating a first timer having a first duration associated with the first food item. The method further includes identifying a second food item and initiating a second timer, receiving user input regarding the duration of the timers for particular food products, or other commands related to the timers.

20 Claims, 5 Drawing Sheets

(56) References Cited

U.S. PATENT DOCUMENTS

| | | | | |
|---|---|---|---|---|
| 2011/0253693 | A1* | 10/2011 | Lyons | A47J 27/00 |
| | | | | 219/209 |
| 2013/0187781 | A1* | 7/2013 | Bach | F24C 15/2064 |
| | | | | 126/299 R |
| 2018/0324908 | A1* | 11/2018 | Denker | F24C 7/085 |
| 2019/0053332 | A1* | 2/2019 | Cheng | F24C 7/046 |
| 2020/0019861 | A1* | 1/2020 | Jeong | G06N 3/08 |
| 2020/0043156 | A1* | 2/2020 | Fox | G06V 20/40 |
| 2020/0085275 | A1* | 3/2020 | Lee | A47L 15/46 |
| 2021/0043108 | A1* | 2/2021 | Baumback | G06F 40/284 |
| 2022/0156496 | A1* | 5/2022 | Drake | G06V 20/52 |

FOREIGN PATENT DOCUMENTS

| | | | |
|---|---|---|---|
| WO | WO2019128543 | A1 | 7/2019 |
| WO | WO2020077501 | A1 | 4/2020 |

\* cited by examiner

SYSTEM AND METHOD FOR DETECTING FOOD ITEMS AND MANAGING COOKING TIMERS ON A COOKTOP APPLIANCE

FIELD OF THE INVENTION

The present subject matter relates generally to over-the-range appliances, and more particularly to an over-the-range appliance configured for monitoring cooking processes being performed on a range or cooktop appliance.

BACKGROUND OF THE INVENTION

Cooktop or range appliances generally include heating elements for heating cooking utensils, such as pots, pans, and griddles. These heating elements can vary in size, location, and capability across the appliance. Grates, a glass panel, or some other suitable support may be positioned over the heating elements for supporting one or more cooking utensils to facilitate a cooking process.

Often, a separate appliance is mounted directly above a cooktop or range appliance, referred to herein generally as an over-the-range appliance. Such over-the-range appliance may be a kitchen hub, a vent hood, or a microwave oven appliance (i.e., microwave appliance). For example, these over-the-range (OTR) appliances may include a cabinet including a cooking chamber and an image monitor for displaying useful information to the user. Certain conventional OTR appliances include cameras directed toward the lower range or cooktop for providing images or a live feed of the cooktop to a user of the appliance. However, these cameras passively transmit such photos or video feeds and provide no further interactive or responsive capabilities.

Notably, when cooking, it is often desirable that foods be cooked for specific times to achieve the ideal level of doneness. Setting a timer can be useful to achieve this goal. However, when there are multiple food items in process and cooking times are short or staggered, maintaining manual timers and cooking for the proper amount of time can be difficult. In this regard, the timers need to be set and reset regularly and there is often the need for overlapping timers as foods are started at different times. Particularly when multiple food items are being cooked, managing an individual timer for each of the food items may be a confusing and difficult process.

Accordingly, an over-the-range appliance with improved features for monitoring cooking times would be desirable. More specifically, an over-the-range appliance that monitors a cooking process and facilitates cook time monitoring would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, an over-the-range appliance mountable over a cooktop appliance is provided. The cooktop appliance includes a cooktop surface for supporting one or more cooking utensils. The over-the-range appliance includes a cabinet, a camera assembly mounted to a bottom of the cabinet in view of the cooktop surface of the cooktop appliance, and a controller operably coupled to the camera assembly. The controller is configured to obtain an image of the cooktop surface, analyze the image to identify a first food item positioned on the cooktop surface, and initiate a first timer having a first duration associated with the first food item.

In another exemplary embodiment, a method of monitoring a cooking process using an over-the-range appliance mountable over a cooktop appliance having a cooktop surface is provided. The over-the-range appliance includes a camera directed at the cooktop surface and the method includes obtaining an image of the cooktop surface, analyzing the image to identify a first food item positioned on the cooktop surface, and initiating a first timer having a first duration associated with the first food item.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

Figure 1:
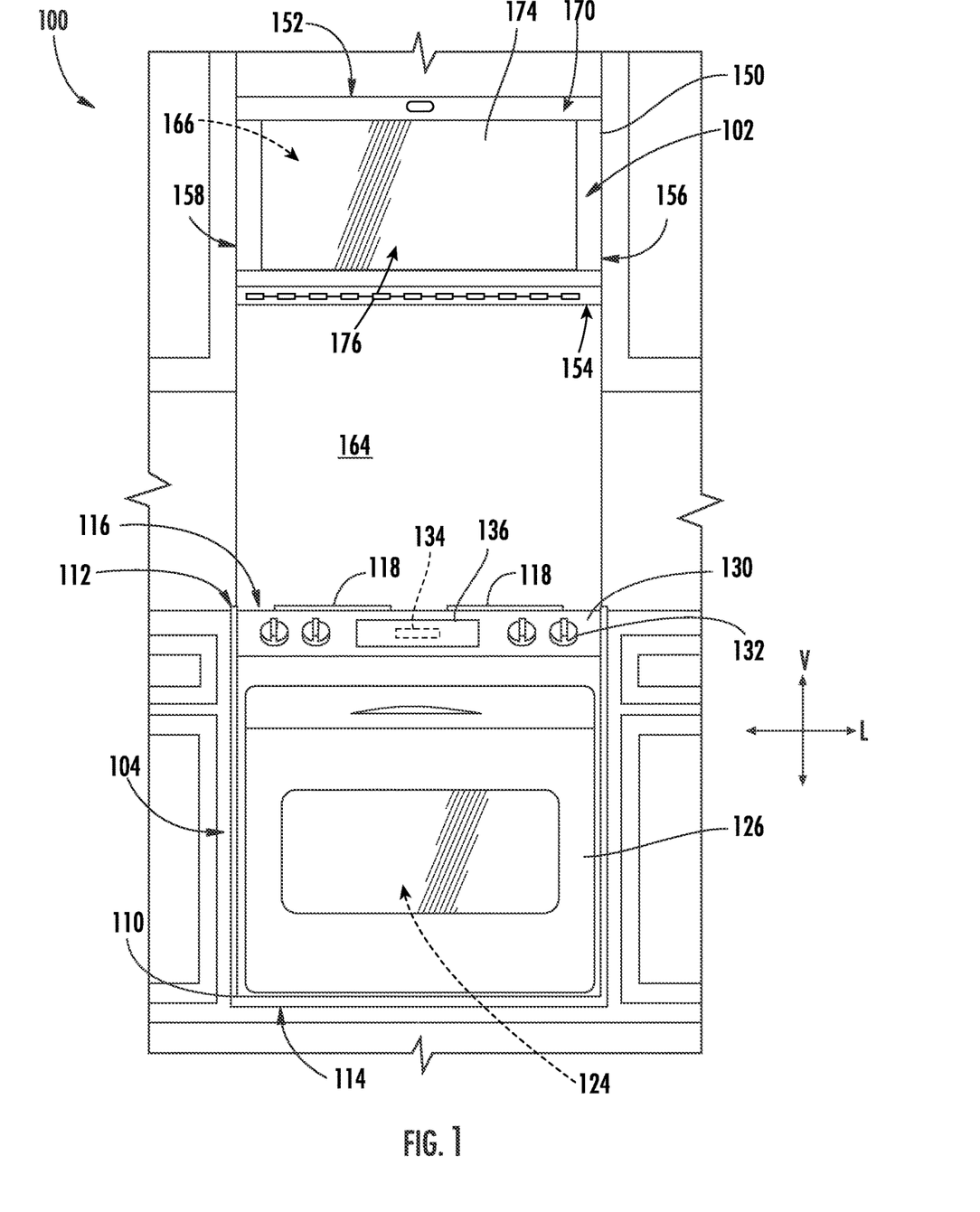
FIG. 1 provides a front view of a system, including a microwave appliance positioned above an oven appliance, according to exemplary embodiments of the present disclosure.
Figure 2:
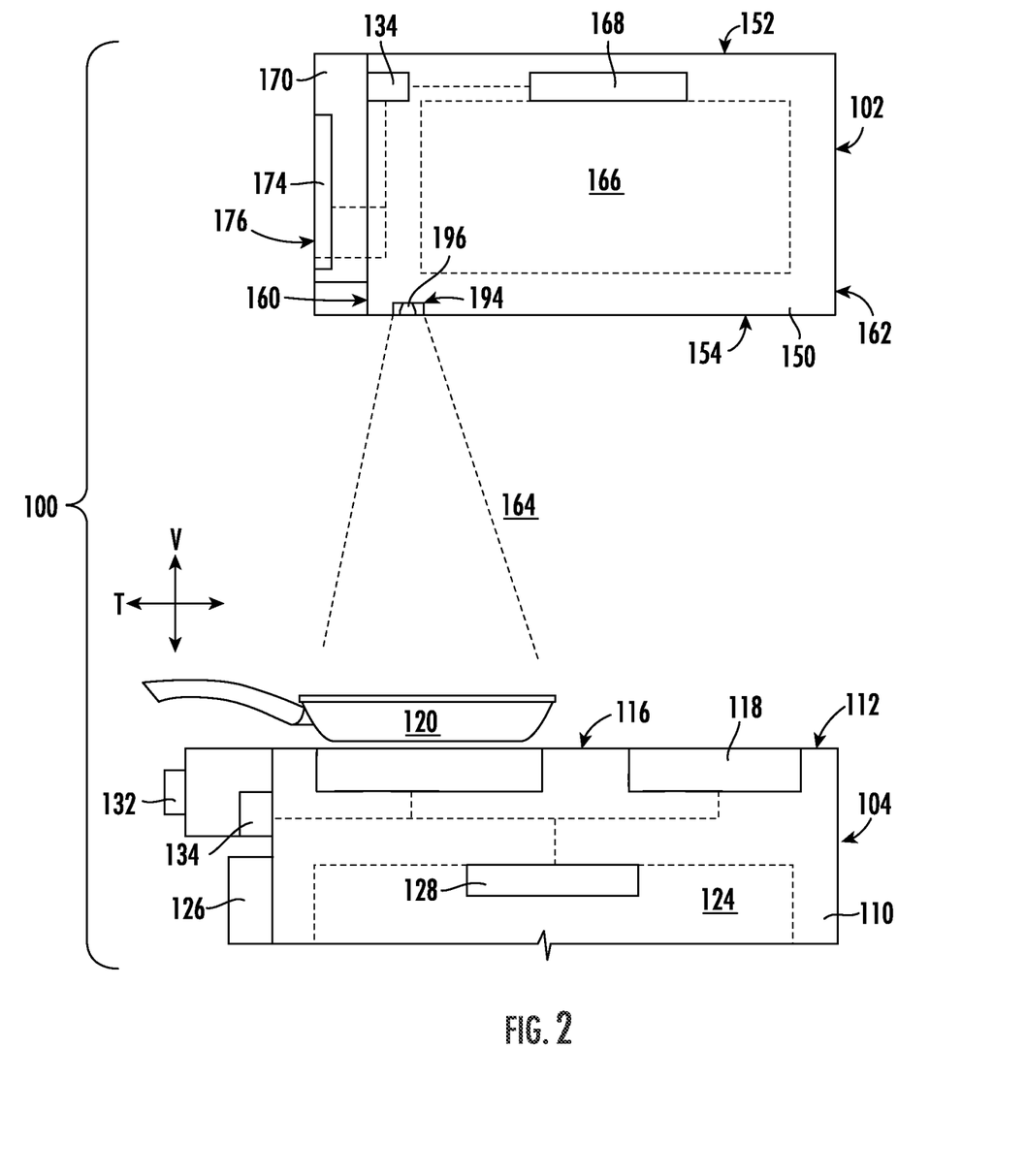
FIG. 2 provides a side schematic view of the exemplary system of FIG. 1 according to exemplary embodiments of the present disclosure.

Turning to the figures, FIGS. 1 and 2 provide various views of a system 100 according to exemplary embodiments of the present disclosure. System 100 generally includes an over-the-range (OTR) appliance, illustrated herein as a microwave appliance 102 that can be positioned or mounted above a cooktop appliance 104. Each of these appliances 102, 104 within system 100 will be described independently and collectively below. However, it should be appreciated that the present subject matter is not limited to the specific appliances disclosed, and the specific appliance configurations are not intended to limit the scope of the present subject matter in any manner. For example, the OTR appliance illustrated herein is a microwave oven. However, according to alternative embodiments, the OTR appliance may be a kitchen hub, a vent hood, an interactive display mounted on a cabinet, etc.

Figure 3:
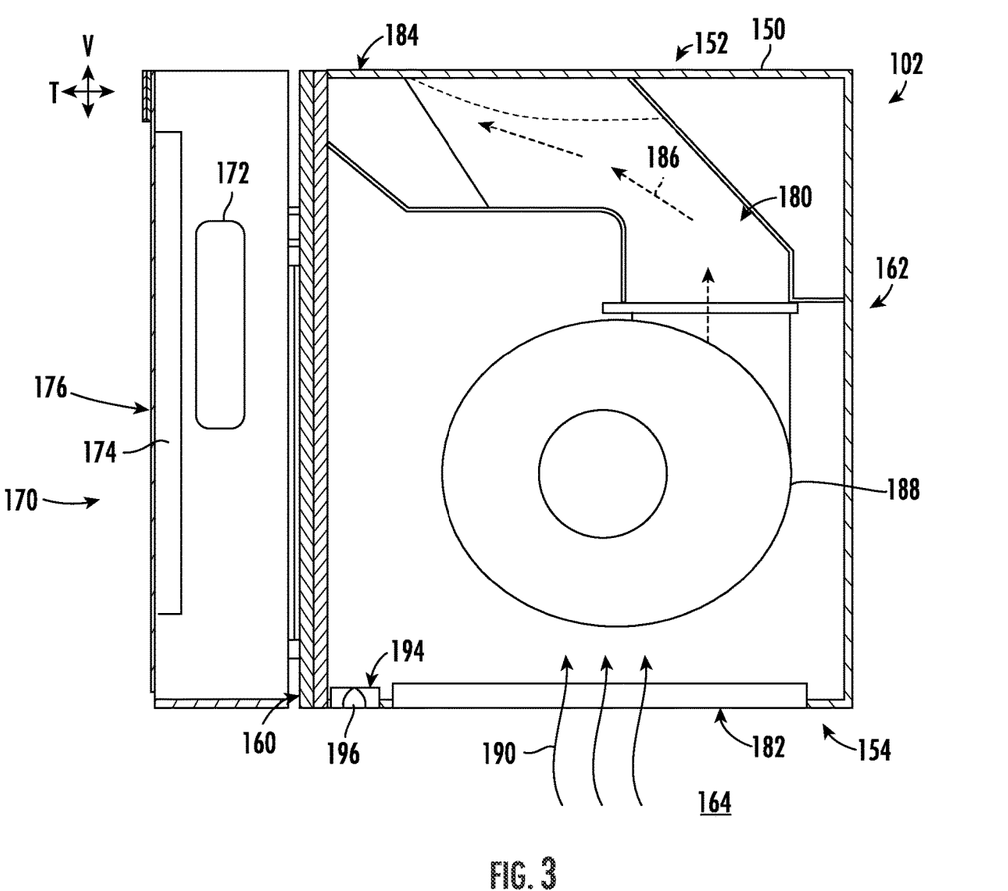
FIG. 3 provides a side schematic view of the exemplary microwave appliance of FIG. 1 according to exemplary embodiments of the present disclosure.

As shown in FIGS. 1 through 3, system 100 defines a vertical direction V, a lateral direction L, and a transverse direction T. The vertical, lateral, and transverse directions are mutually perpendicular and form an orthogonal direction system. As used herein, this coordinate system applies equally to both microwave appliance 102 and cooktop appliance 104 and will thus be used interchangeably to describe both appliances and their positions relative to each other.

Cooktop appliance 104 can include a chassis or cabinet 110 that extends along the vertical direction V between a top portion 112 and a bottom portion 114; along the lateral direction L between a left side portion and a right side portion; and along the traverse direction T between a front portion and a rear portion. Cooktop appliance 104 includes a cooktop surface 116 having one or more heating elements 118 for use in, for example, heating or cooking operations. In exemplary embodiments, cooktop surface 116 is constructed with ceramic glass. In other embodiments, however, cooktop surface 116 may include of another suitable material, such as a metallic material (e.g., steel) or another suitable non-metallic material.

Heating elements 118 may be various sizes and may employ any suitable method for heating or cooking an object, such as a cooking utensil 120 (FIG. 2), and its contents. In some embodiments, for example, heating element 118 uses a heat transfer method, such as electric coils or gas burners, to heat cooking utensil 120. In other embodiments, however, heating element 118 uses an induction heating method to heat cooking utensil 120 directly. In turn, heating element 118 may include a gas burner element, resistive heat element, radiant heat element, induction element, or another suitable heating element.

In some embodiments, cooktop appliance 104 includes an insulated cabinet 110 that defines a cooking chamber 124 selectively covered by a door 126. One or more heating elements 128 (e.g., top broiling elements or bottom baking elements) may be enclosed within cabinet 110 to heat cooking chamber 124. Heating elements 128 within cooking chamber 124 may be provided as any suitable element for cooking the contents of cooking chamber 124, such as an electric resistive heating element, a gas burner, a microwave element, a halogen element, etc. Thus, cooktop appliance 104 may be referred to as an oven range appliance. As will be understood by those skilled in the art, cooktop appliance 104 is provided by way of example only, and the present subject matter may be used in the context of any suitable cooking appliance, such as a double oven range appliance or a standalone cooktop (e.g., fitted integrally with a surface of a kitchen counter). Thus, the example embodiments illustrated in figures are not intended to limit the present subject matter to any particular cooking chamber or heating element configuration, except as otherwise indicated.

As illustrated, a user interface panel 130 may be provided on cooktop appliance 104. Although shown at front portion of cooktop appliance 104, another suitable location or structure (e.g., a backsplash) for supporting user interface panel 130 may be provided in alternative embodiments. In some embodiments, user interface panel 130 includes input components or controls 132, such as one or more of a variety of electrical, mechanical, or electro-mechanical input devices. Controls 132 may include, for example, rotary dials, knobs, push buttons, and touch pads. A controller 134 is in communication with user interface panel 130 and controls 132 through which a user may select various operational features and modes and monitor progress of cooktop appliance 104. In additional or alternative embodiments, user interface panel 130 includes a display component 136, such as a digital or analog display in communication with a controller 134 and configured to provide operational feedback to a user. In certain embodiments, user interface panel 130 represents a general purpose I/O ("GPIO") device or functional block.

As shown, controller 134 is communicatively coupled (i.e., in operative communication) with user interface panel 130, controls 132, and display 136. Controller 134 may also be communicatively coupled with various operational components of cooktop appliance 104 as well, such as heating elements (e.g., 118, 128), sensors, etc. Input/output ("I/O") signals may be routed between controller 134 and the various operational components of cooktop appliance 104. Thus, controller 134 can selectively activate and operate these various components. Various components of cooktop appliance 104 are communicatively coupled with controller 134 via one or more communication lines such as, for example, conductive signal lines, shared communication busses, or wireless communications bands.

In some embodiments, controller 134 includes one or more memory devices and one or more processors. The processors can be any combination of general or special purpose processors, CPUs, or the like that can execute programming instructions or control code associated with operation of cooktop appliance 104. The memory devices (i.e., memory) may represent random access memory such as DRAM or read only memory such as ROM or FLASH. In one embodiment, the processor executes programming instructions stored in memory. The memory may be a separate component from the processor or may be included onboard within the processor. Alternatively, controller 134 may be constructed without using a processor, for example, using a combination of discrete analog or digital logic circuitry (such as switches, amplifiers, integrators, comparators, flip-flops, AND gates, and the like) to perform control functionality instead of relying upon software.

In certain embodiments, controller 134 includes a network interface such that controller 134 can connect to and communicate over one or more networks with one or more network nodes. Controller 134 can also include one or more transmitting, receiving, or transceiving components for transmitting/receiving communications with other devices communicatively coupled with cooktop appliance 104, such as microwave appliance 102. Additionally, or alternatively, one or more transmitting, receiving, or transceiving components can be located off board controller 134. Generally, controller 134 can be positioned in any suitable location throughout cooktop appliance 104. For example, controller 134 may be located proximate user interface panel 130 toward front portion of cooktop appliance 104. In optional embodiments, controller 134 is in operable communication with a controller 134 (described below) of microwave appliance 102 (e.g., through one or more wired or wireless channels).

As noted above, microwave appliance 102 may be positioned or mounted above cooktop appliance 104 (e.g., as an OTR microwave). Specifically, an insulated cabinet 150 of microwave appliance 102 may be positioned above cooktop appliance 104 along the vertical direction V. As shown, cabinet 150 of microwave appliance 102 includes a plurality of outer walls and when assembled, microwave appliance 102 generally extends along the vertical direction V between a top end 152 and a bottom end 154; along the lateral direction L between a first side end 156 and a second side end 158; and along the transverse direction T between a front end 160 and a rear end 162. In some embodiments, cabinet 150 is spaced apart from cooktop surface 116 along the vertical direction V. An open region 164 may thus be defined along the vertical direction V between cooktop surface 116 and bottom end 154 of cabinet 150. Although a generally rectangular shape is illustrated, any suitable shape or style may be adapted to form the structure of cabinet 150. Within cabinet 150, an internal liner of cabinet 150 defines a cooking chamber 166 for receipt of food items for cooking.

Microwave appliance 102 is generally configured to heat articles (e.g., food or beverages) within cooking chamber 166 using electromagnetic radiation. Microwave appliance 102 may include various components which operate to produce the electromagnetic radiation, as is generally understood. For example, microwave appliance 102 may include a heating assembly 168 having a magnetron (e.g., a cavity magnetron), a high voltage transformer, a high voltage capacitor, and a high voltage diode, as is understood. The transformer may provide energy from a suitable energy source (such as an electrical outlet) to the magnetron. The magnetron may convert the energy to electromagnetic radiation, specifically microwave radiation. The capacitor generally connects the magnetron and transformer, such as via high voltage diode, to a chassis. Microwave radiation produced by the magnetron may be transmitted through a waveguide to cooking chamber 166.

The structure and intended function of microwave ovens or appliances are generally understood by those of ordinary skill in the art and are not described in further detail herein. According to alternative embodiments, microwave appliance 102 may include one or more heating elements, such as electric resistance heating elements, gas burners, other microwave heating elements, halogen heating elements, or suitable combinations thereof, are positioned within cooking chamber 166 for heating cooking chamber 166 and food items positioned therein.

Microwave appliance 102 includes a door assembly 170 that is movably mounted (e.g., rotatably attached) to cabinet 150 in order to permit selective access to cooking chamber 166. Specifically, door assembly 170 can move between an open position (not pictured) and a closed position (e.g., FIG. 1). The open position permits access to cooking chamber 166 while the closed position restricts access to cooking chamber 166. Except as otherwise indicated, with respect to the directions (e.g., the vertical direction V, the lateral direction L, and the transverse direction T), the door assembly 170 is described in the closed position. A handle 172 (FIG. 3) may be mounted to or formed on door assembly 170 to assist a user with opening and closing door assembly 170. As an example, a user can use handle 172 to open or close door assembly 170 and access or cover cooking chamber 166. Additionally, or alternatively, microwave appliance 102 may include a door release button (not pictured) that disengages or otherwise pushes open door assembly 170 when depressed.

Referring still generally to FIGS. 1 through 3, microwave appliance 102 may include an interactive display 174. According to the illustrated embodiment, interactive display 174 is mounted to or within a door assembly 170 and defines substantially the entire front surface of door assembly 170. In this regard, interactive display 174 extends along substantially the entire width of door assembly 170 along the lateral direction L and substantially along the entire height of door assembly 170 along the vertical direction V.

Generally, interactive display 174 may be any suitable type of mechanism for visually presenting a digital (e.g., interactive) image. For example, interactive display 174 may be an image monitor such as a liquid crystal display (LCD), a plasma display panel (PDP), a cathode ray tube (CRT) display, etc. Thus, interactive display 174 includes an imaging surface 176 (e.g., screen or display panel) at which the digital image is presented or displayed as an optically-viewable picture (e.g., static image or dynamic video) to a user. As illustrated, the imaging surface 176 generally faces, or is directed toward the area forward from the appliance 102 (e.g., when door assembly 170 is in the closed position). During use, a user standing in front of microwave appliance 102 may thus see the optically-viewable picture (e.g., recipe, dynamic video stream, graphical user interface, etc.) displayed at the imaging surface 176.

The optically-viewable picture at the imaging surface 176 may correspond to any suitable signal or data received or stored by microwave appliance 102 (e.g., at controller 134). As an example, interactive display 174 may present recipe information in the form of viewable text or images. As another example, interactive display 174 may present a captured image, such as a live (e.g., real-time) dynamic video stream received from camera assembly 194 and may include suitable virtual timers (as described below). As yet another example, interactive display 174 may present a graphical user interface (GUI) (e.g., as part of user interface) that allows a user to select or manipulate various operational features of microwave appliance 102 or cooktop appliance 104. During use of such GUI embodiments, a user may engage, select, or adjust the image presented at interactive display 174 through any suitable input, such as gesture controls detected through camera assembly 100 for, voice controls detected through one or more microphones, associated touch panels (e.g., capacitance or resistance touch panels) or sensors overlaid across imaging surface 176, etc.

According to the illustrated embodiment, interactive display 174 is a tablet or touch screen display that extends an entire width and height of door assembly 170 and provides for an interactive experience to the user of microwave appliance 102.

Similar to cooktop appliance 104, microwave appliance 102 may include a controller 134 that facilitates operation of microwave appliance 102. In addition, it should be appreciated that according to exemplary embodiments, in addition to interactive display 174, microwave appliance may further include an additional user interface panel (e.g., similar to user interface panel 130), user inputs (e.g., similar to user inputs 132), a controller (e.g., similar to controller 134), and/or additional displays (such as display 136). Controller 134 may be mounted within cabinet 150, may be mounted within or be a part of interactive display 174, or may be positioned and integrated in any other suitable manner. In some embodiments, cooktop controller 134 is provided as or as part of microwave controller 134. In alternative embodiments, cooktop controller 134 is a discrete unit in selective operable communication with microwave controller 134 (e.g., through one or more wired or wireless channels). A detailed description of such components is omitted here for brevity.

Referring now briefly to FIG. 3, in certain embodiments, an exhaust passage 180 is defined within cabinet 150. As shown, exhaust passage 180 may extend between an exhaust inlet 182 and an exhaust outlet 184 (e.g., through one or more external walls of cabinet 150) and may be in fluid isolation from door assembly 170. In some embodiments, exhaust inlet 182 is defined through cabinet 150 proximal to the bottom end 154 (e.g., through a bottom wall or directly above cooktop surface 116—FIG. 2). In additional or alternative embodiments, exhaust outlet 184 is defined through cabinet 150 proximal to the top end 152 (e.g., through a top wall of cabinet 150). Optionally, exhaust outlet 184 may include a plurality of exhaust apertures. According to still other embodiments, exhaust outlet 184 may also be partially defined within door assembly 170.

According to exemplary embodiments, exhaust outlet 184 is positioned on top end 152 of cabinet 150 rearward from door assembly 170 along the transverse direction T. In this manner, a flow of exhaust air (identified herein generally by reference numeral 186) is discharged rearward of door assembly 170 along the transverse direction T. In addition, or alternatively, door assembly 170 may define a discharge scoop and a door exhaust vent (not shown) that are in fluid communication with the exhaust passage 180. In this manner, the flow of exhaust air 186 may be directed past front end 160 of cabinet 150 where the discharge scoop directs the flow of exhaust air 186 up and away from microwave appliance 102.

An exhaust air handler 188 may be mounted within exhaust passage 180. As would be understood, exhaust air handler 188 may be provided as any suitable blower or fan (e.g., radial fan, tangential fan, etc.) positioned within cabinet 150 to actively rotate or motivate air, steam, or exhaust fumes through exhaust passage 180. During use, the heat, steam, or exhaust fumes 190 may be motivated by exhaust air handler 188 from open region 164 (FIG. 2) to exhaust passage 180 through exhaust inlet 182 into exhaust outlet 184 (e.g., as indicated at arrows 186). Optionally, one or more filters (not pictured) may be provided at exhaust inlet 182 (e.g., between open region 164 and exhaust passage 180) to clean the air, steam, or exhaust fumes (e.g., at 190) as it enters cabinet 150. For instance, a grease filter having a suitable coarse filter medium, such as a metallic mesh including aluminum or stainless steel, may be mounted across exhaust inlet 182. Additionally, or alternatively, an odor filter having a suitable fine filter medium, such as a mesh or block including activated carbon, may be mounted across exhaust inlet 182. Optionally, the odor filter may be positioned above or downstream from the grease filter.

Referring now specifically to FIGS. 2 and 3, microwave appliance 102 may further include a camera assembly 194 that is generally positioned and configured for obtaining images of cooktop appliance 104 during operation. Specifically, according to the illustrated embodiment, camera assembly 194 includes a camera 196 that is mounted to bottom end 154 of cabinet 150. Specifically, camera 196 is mounted such that is faces downward along the vertical direction V toward cooktop surface 116. In this manner, camera 196 can take images or video of cooking utensil 120 while positioned on heating element 118 and performing a cooking process. Although camera assembly 194 is illustrated as including a single camera 196 positioned over and configured for monitoring a single heating element 118 on cooktop surface 116, it should be appreciated that according to alternative embodiments, camera assembly 194 may include any suitable number, type, size, and configuration of camera(s) 196 for obtaining images of any suitable number and position of heating elements 118 or the entire cooktop surface 116 in a single image. For example, camera assembly 194 may include features for adjusting the field-of-view and/or orientation of camera 196, such that a single camera 196 may be adjusted to monitor cooking operations being performed on more than one heating element 118. According to still other embodiments, camera assembly 194 may include a plurality of cameras 196, each camera 196 being positioned for monitoring a cooking process being performed on a particular heating element 118. Notably, controller 134 of microwave appliance 102 (or any other suitable dedicated controller) may be communicatively coupled to camera assembly 194 and may be programmed or configured for analyzing the images obtained by camera assembly 194, e.g., in order to monitor the performance of a cooking cycle, receive user inputs regarding the cooking process or associated timers, and manage the initiation and canceling of timers corresponding to food being cooked.

Now that the construction of system 100 and camera assembly 194 according to exemplary embodiments have been presented, an exemplary method 200 of operating system will be described. Although the discussion below refers to the exemplary method 200 of operating camera assembly 194 to monitor and manage a cooking processes being performed on cooktop appliance 104, one skilled in the art will appreciate that the exemplary method 200 is applicable to the monitoring of cooking processes on any suitable number and type of appliances. In exemplary embodiments, the various method steps as disclosed herein may be performed by controller 134 or a separate, dedicated controller.

Figure 4:
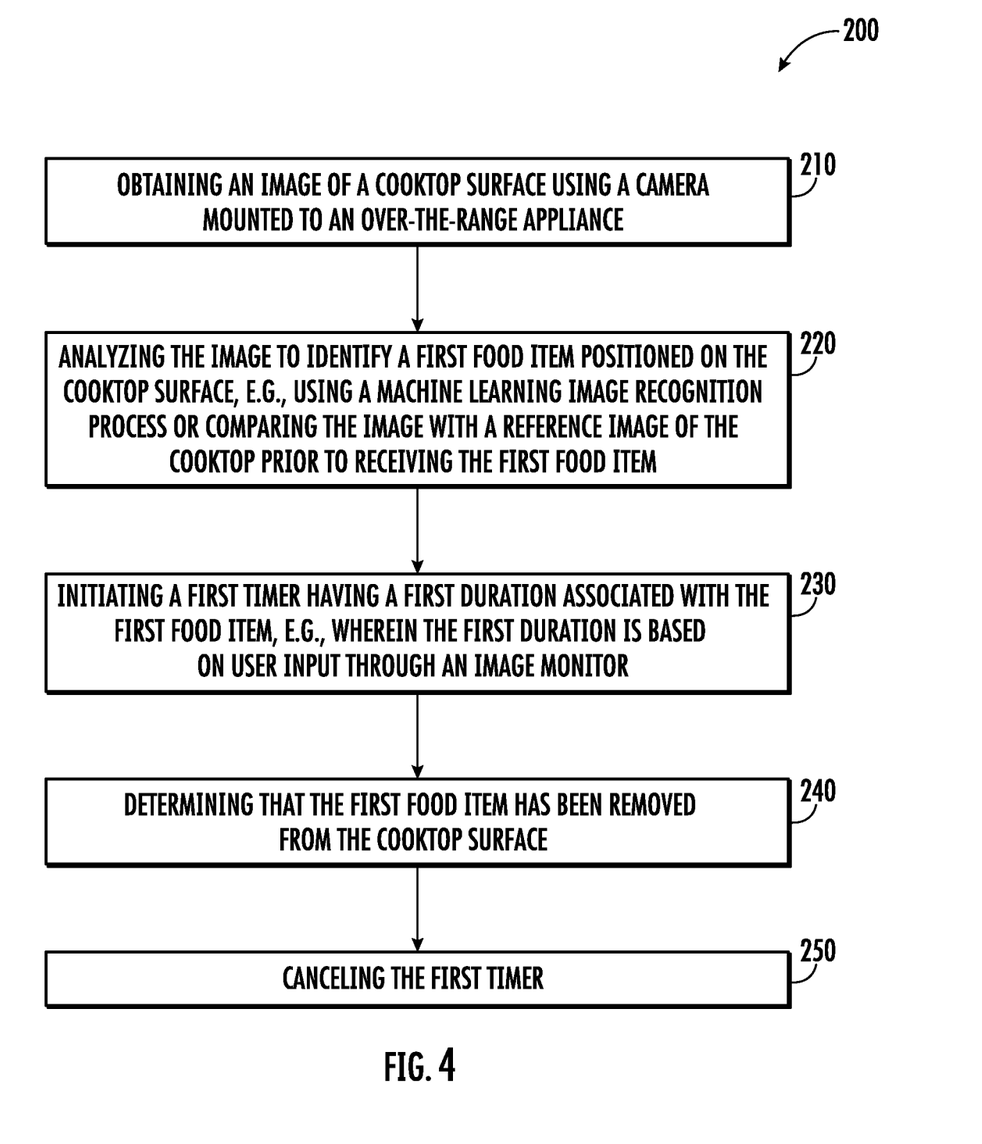
FIG. 4 provides a method of operating a microwave appliance that is positioned over a cooktop to monitor a cooking process being performed on that cooktop according to an exemplary embodiment of the present subject matter.

Referring generally to FIG. 4, a method of operating a camera assembly in a cooking system is provided. According to exemplary embodiments, method 200 includes, at step 210, obtaining an image of a cooktop surface using a camera mounted to an over-the-range appliance. For example, continuing the example from above, camera assembly 194 (e.g., or more specifically camera 196) may be used to obtain one or more images of cooktop surface 116 of cooktop appliance 104, including any cooking utensils or food items being cooked thereon. Although the term "image" is used herein, it should be appreciated that according to exemplary embodiments, camera assembly 194 may take any suitable number or sequence of images, video, or other visual representations of cooking utensil 120, cooktop surface 116, and/or food items positioned thereon. These obtained images may vary in number, frequency, angle, resolution, detail, etc.

As explained above, camera assembly 194 may include a single camera intended to attain a single image of the entire cooktop surface 116 including all cooking utensils 120 positioned on all heating elements 118. According to still other embodiments, camera assembly 194 may include a plurality of cameras 196 positioned at different locations and having a field-of-view oriented towards different heating elements 118 to obtain independent images of each cooking location.

Step 220 may include analyzing the image to identify a first food item positioned on the cooktop surface. In this regard, referring briefly to FIGS. 5 and 6, exemplary images obtained by camera 196 are illustrated for purpose of describing aspects of the present subject matter. According to this exemplary embodiment, a first food item (e.g., identified herein generally by reference numeral 300) is an egg positioned at a back left side of cooking utensil 120. Although first food item 300 is illustrated herein as an egg positioned on cooking utensil 120, it should be appreciated that according to alternative embodiments, first food item 300 may be any suitable item being heated or otherwise cooked on cooktop surface 116 (e.g., directly, on a cooking utensil, on a griddle, or in any other suitable manner).

According to exemplary embodiments, this image analysis may use any suitable image processing technique, image recognition process, etc. As used herein, the terms "image recognition process," "image processing algorithm," "food item detection," and similar terms may be used generally to refer to any suitable method of observation, analysis, image decomposition, feature extraction, image classification, etc. of one or more images or videos taken of cooktop surface 116, cooking utensil 120, and/or cooktop appliance 104. In this regard, the image recognition process may use any suitable image recognition software or algorithm to constantly or periodically monitor cooktop surface 116.

For example, according to exemplary embodiments, step 220 may include utilizing an image processing algorithm, a machine learning image recognition process, any suitable artificial intelligence (AI) technique, and/or any other suitable image analysis techniques, example of which will be described in more detail below. Moreover, each of the exemplary image analysis or evaluation processes described below may be used independently, collectively, or interchangeably to extract detailed information regarding the images being analyzed to facilitate improved appliance operation. According to exemplary embodiments, any suitable number and combination of image processing or analysis techniques may be used to obtain an accurate analysis of the obtained images.

For example, the image processing algorithm may rely on image differentiation, e.g., such as a pixel-by-pixel comparison of two sequential images. For example, the images obtained at step 210 may be compared to a series of images of cooktop surface 116 prior to receiving any food items. By comparing differences between the actual obtained images of the cooktop surface to images without any food items, controller 134 may isolate and identify newly added food items. Other image processing techniques are possible and within the scope of the present subject matter.

As noted above, step 220 may further include analyzing images to identify food items using a machine learning image recognition process. In this regard, the images obtained at step 210 may analyzed using a neural network classification module and/or a machine learning image recognition process. It should be appreciated that this image analysis or processing may be performed locally (e.g., by controller 134) or remotely (e.g., by a remote server). According to exemplary embodiments, this analysis relies at least in part on a neural network trained with a plurality of images of cooktop surfaces, cooking utensils, food items, etc. By analyzing the images obtained at step 210 using this machine learning image recognition process, controller 134 may detect and identify food items positioned on cooktop surface 134, along with other useful qualitative or quantitative information for improved appliance operation.

According to an exemplary embodiment, controller may implement a form of image recognition called region based convolutional neural network ("R-CNN") image recognition. Generally speaking, R-CNN may include taking an input image and extracting region proposals that include a potential object, such as a particular food item. In this regard, a "region proposal" may be regions in an image that could belong to a particular object, such as a particular food item. A convolutional neural network is then used to compute features from the region proposals and the extracted features will then be used to determine a classification for each particular region.

According to still other embodiments, an image segmentation process may be used along with the R-CNN image recognition. In general, image segmentation creates a pixel-based mask for each object in an image and provides a more detailed or granular understanding of the various objects within a given image. In this regard, instead of processing an entire image—i.e., a large collection of pixels, many of which might not contain useful information—image segmentation may involve dividing an image into segments (e.g., into groups of pixels containing similar attributes) that may be analyzed independently or in parallel to obtain a more detailed representation of the object or objects in an image. This may be referred to herein as "mask R-CNN" and the like.

According to still other embodiments, the image recognition process may use any other suitable neural network process. For example, step 220 may include using Mask R-CNN instead of a regular R-CNN architecture. In this regard, Mask R-CNN is based on Fast R-CNN which is slightly different than R-CNN. For example, R-CNN first applies CNN and then allocates it to zone recommendations on the covn5 property map instead of the initially split into zone recommendations. In addition, according to exemplary embodiments standard CNN may be used to analyze the image and identify a food item. In addition, a K-means algorithm may be used. Other image recognition processes are possible and within the scope of the present subject matter.

It should be appreciated that any other suitable image recognition process may be used while remaining within the scope of the present subject matter. For example, step 220 may include using a deep belief network ("DBN") image recognition process. A DBN image recognition process may generally include stacking many individual unsupervised networks that use each network's hidden layer as the input for the next layer. According to still other embodiments, step 220 may include the implementation of a deep neural network ("DNN") image recognition process, which generally includes the use of a neural network (computing systems inspired by the biological neural networks) with multiple layers between input and output. Other suitable image recognition processes, neural network processes, artificial intelligence ("AI") analysis techniques, and combinations of the above described or other known methods may be used while remaining within the scope of the present subject matter.

Figure 5:
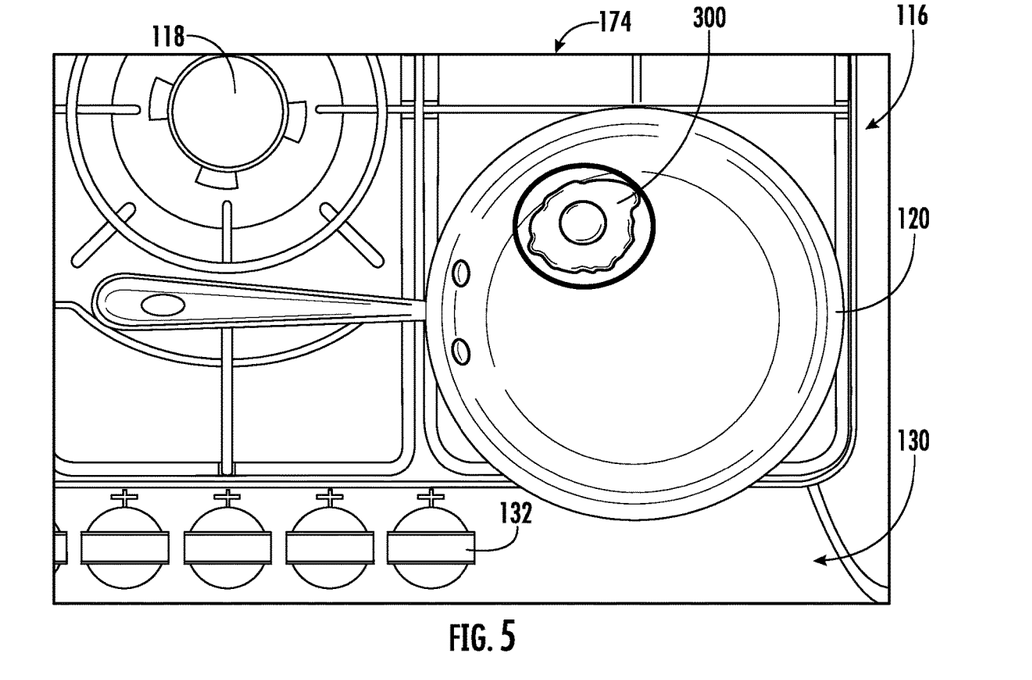
FIG. 5 provides a schematic view of an interactive display of the exemplary microwave appliance of FIG. 1 implementing the exemplary method of FIG. 4 according to an exemplary embodiment of the present subject matter.
Figure 6:
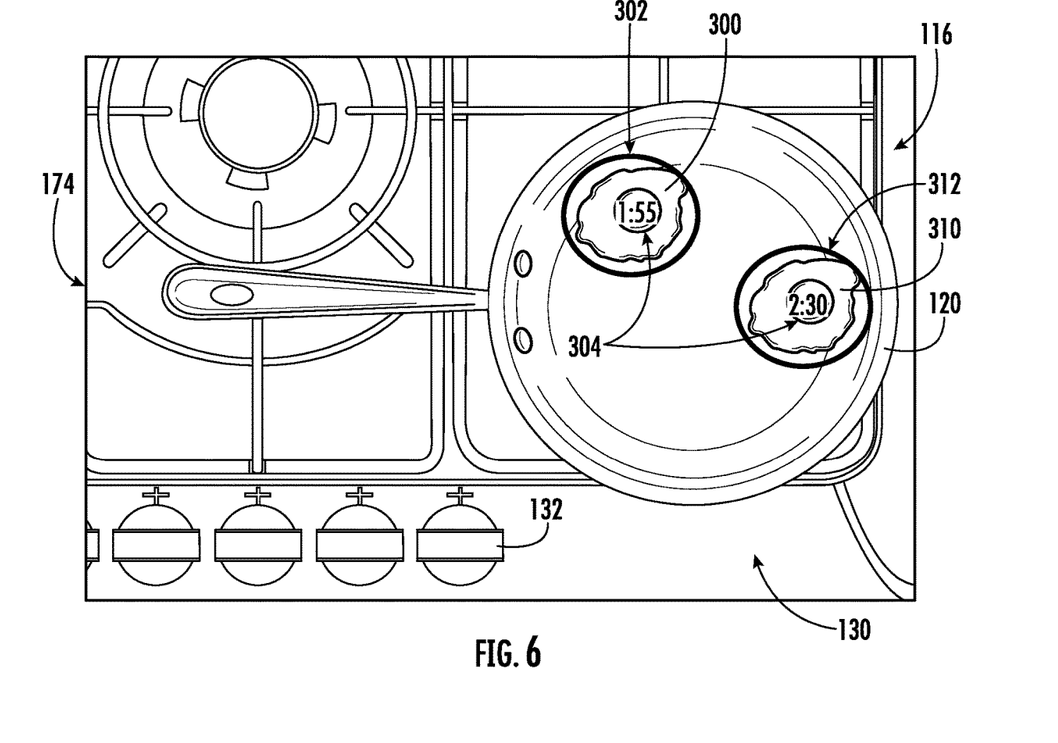
FIG. 6 provides another schematic view of the interactive display of the exemplary microwave appliance of FIG. 1 implementing the exemplary method of FIG. 4 according to an exemplary embodiment of the present subject matter.

Step 230 includes initiating a first timer having a first duration associated with the first food item. As shown in FIGS. 5 and 6, a first timer 302 shown schematically as positioned or superimposed over first food item 300. As used herein, the term "first duration" (or more generally, the "timer duration") is generally intended to refer to the total desired cooking time for first food item 300 (or more generally, a corresponding food item), e.g., the initial start time of first timer 302. As illustrated, first timer 302 may further include a remaining cook time (e.g., as identified generally by reference numeral 304). This remaining cook time 304 may represent the amount of time remaining on the corresponding timer, e.g., equivalent to the original timer duration minus the time that has passed since the timer was initiated. According to exemplary embodiments, the displays illustrated in FIGS. 5 and 6 may be supplied to the user, e.g., via interactive display 174 or via remote device (e.g., such as a mobile phone through a network and mobile software application). In this manner, a user may monitor the remaining cook time 304 of food items placed on cooking utensil 120. As explained in more detail below, a user may use interactive display to manipulate the cook timers, e.g., by pausing, restarting, canceling, removing, etc.

Continuing the example from above, first food item 300 may generally include an ideal cooking time to achieve the desired level of doneness. For example, a user wishing to cook the egg (e.g., first food item 300) to over-easy may cook the egg for precisely 2 minutes and 30 seconds. It should be appreciated that the cooking duration of the first food item may be set by a user, may be determined using an internal or external database based at least in part on the type of food being cooked, may be determined based on user preferences or historical cooking times, or may be obtained in any other suitable manner.

For example, according to an exemplary embodiment, the first duration of the first timer may be based directly on user input, e.g., through interactive display 174. In this regard, the images shown in FIGS. 5 and 6 may be displayed on interactive display 174. When first food item 300 is detected on cooktop surface 116, interactive display 174 may display first timer 302 over or around first food item 300 and may prompt the user to enter the desired cook time, i.e., the first duration. In this regard, interactive display 174 may be used to select food items, enter desired times, supply intermediate interaction steps, pause timers, restart timers, cancel timers, or otherwise manipulate the food timing and monitoring process.

Once the user enters the first duration, first timer 302 may be initiated to begin a countdown for the cooking process. Notably, as described herein, the first duration generally corresponds to the entire amount of time needed to cook first food item 300. However, it should be appreciated that the first duration may alternatively correspond to any other suitable step, iteration, or increment in the cooking process. For example, according to alternative embodiments, the first duration may be equivalent to a first interaction time with the first food item 300. In this regard, the interaction may correspond to flipping or turning over the egg, and the first duration may be equivalent to half of the total desired cook time. It should be appreciated that these durations may vary according to alternative embodiments, e.g., based on the type of food, the desired interactions with the food, or any other suitable food characteristics or cooking parameters.

Notably, camera assembly 194 may be used to monitor more than one food item that is positioned on cooktop surface 116. For example, if a user is cooking a second food item 310 in addition to first food item 300, method 200 may include determining that second food item 210 has been added to cooktop surface 116. Method 200 may further include initiating a second timer 312 that corresponds to a second food item 310. More specifically, method 200 may include prompting the user for a second duration or cook time that corresponds with second food item 310. According still other embodiments, method 200 may include determining that the second food item 310 is identical to or similar to first food item 300 and setting the second duration equivalent to the first duration. After the second duration is determined, the controller 134 may independently monitor and display the countdown times of first timer 302 and second timer 312 to provide the user with updated remaining cook times 304 of each food item 300, 310.

Method 200 may further include, at step 240, determining that the first food item has been removed from the cooktop surface and step 250 may include canceling the first timer. In this regard, method 200 may include continuously monitoring cooktop surface 116 (e.g., by obtaining periodic images and analyzing as described herein) to determine when food items are added to or removed from cooktop surface 116. Thus, when a user removes first food item 300 from cooking utensil 120, step 250 may include canceling and removing first timer 302 from the interactive display 174. Moreover, if a user adds a third item, the timing process may be independently performed in a manner similar to that described above. This process of adding, removing, or updating timers facilitates an improved cooking process with less management by or distraction of a user of system 100.

FIG. 4 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 are explained using system 100 and camera assembly 194 as an example, it should be appreciated that these methods may be applied to the operation of any suitable cooking system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An over-the-range appliance mountable over a cooktop appliance, the cooktop appliance comprising a cooktop surface for supporting one or more cooking utensils, the over-the-range appliance comprising:
   a cabinet;
   a camera assembly mounted to a bottom of the cabinet in view of the cooktop surface of the cooktop appliance;
   an interactive display mounted to a front of the cabinet; and a controller operably coupled to the camera assembly, the controller being configured to:
obtain an image of the cooktop surface;
analyze the image to identify a first food item positioned on the cooktop surface;
initiate a first timer having a first duration associated with the first food item; and
display on the interactive display the image of the cooktop surface with the first timer superimposed over the first food item.

2. The over-the-range appliance of claim 1, wherein analyzing the image to identify the first food item comprises:
analyzing the image using a machine learning image recognition process to identify the first food item.

3. The over-the-range appliance of claim 2, wherein the machine learning image recognition process comprises at least one of a convolution neural network ("CNN"), a region-based convolution neural network ("R-CNN"), a deep belief network ("DBN"), or a deep neural network ("DNN") image recognition process.

4. The over-the-range appliance of claim 1, wherein analyzing the image to identify the first food item positioned on the cooktop surface comprises:
obtaining a reference image of the cooktop surface prior to receiving the first food item; and
identifying the first food item using image differentiation between the reference image and the image of the cooktop surface.

5. The over-the-range appliance of claim 1, wherein the first duration is equivalent to a total cook time of the first food item.

6. The over-the-range appliance of claim 1, wherein the first duration is equivalent to a first interaction time of the first food item.

7. The over-the-range appliance of claim 1, wherein the controller is further configured to:
determine that a second food item has been added to the cooktop surface; and
initiate a second timer having a second duration associated with the second food item.

8. The over-the-range appliance of claim 7, wherein initiating the second timer comprises:
determine that the second food item is similar to the first food item; and
determine that the second duration is equivalent to the first duration.

9. The over-the-range appliance of claim 1, wherein initiating the first timer comprises:
receiving a user input regarding the first duration of the first timer from a user of the over-the-range appliance.

10. The over-the-range appliance of claim 9, wherein the user input is received from the user through the interactive display.

11. The over-the-range appliance of claim 1, wherein initiating the first timer comprises:
displaying the image of the cooktop surface and the first food item; and
receiving a user selection of the first food item and a user input regarding the first duration of the first timer.

12. The over-the-range appliance of claim 1, wherein the controller is further configured to:
receive a user input to pause, restart, or remove the first timer.

13. The over-the-range appliance of claim 1, wherein the controller is further configured to:
determine that the first food item has been removed from the cooktop surface; and
cancel the first timer.

14. A method of monitoring a cooking process using an over-the-range appliance mountable over a cooktop appliance having a cooktop surface, the over-the-range appliance comprising a camera directed at the cooktop surface and an interactive display mounted to a front of the cabinet, the method comprising:
obtaining an image of the cooktop surface;
analyzing the image to identify a first food item positioned on the cooktop surface;
initiating a first timer having a first duration associated with the first food item; and
displaying on the interactive display the image of the cooktop surface with the first timer superimposed over the first food item.

15. The method of claim 14, wherein analyzing the image to identify the first food item comprises:
analyzing the image using a machine learning image recognition process to identify the first food item.

16. The method of claim 14, wherein analyzing the image to identify the first food item positioned on the cooktop surface comprises:
obtaining a reference image of the cooktop surface prior to receiving the first food item; and
identifying the first food item using image differentiation between the reference image and the image of the cooktop surface.

17. The method of claim 14, further comprising:
determining that a second food item has been added to the cooktop surface; and
initiating a second timer having a second duration associated with the second food item.

18. The method of claim 17, wherein initiating the second timer comprises:
determining that the second food item is similar to the first food item; and
determining that the second duration is equivalent to the first duration.

19. The method of claim 14, wherein initiating the first timer comprises:
receiving a user input through the interactive display regarding the first duration of the first timer from a user of the over-the-range appliance.

20. The method of claim 14, further comprising:
determining that the first food item has been removed from the cooktop surface; and
canceling the first timer.

* * * * *